Sept. 13, 1960 R. P. HEUER 2,952,554
BASIC REFRACTORY BRICK
Filed April 21, 1958

INVENTOR
Russell Pearce Heuer
BY
ATTORNEYS

United States Patent Office 2,952,554
Patented Sept. 13, 1960

2,952,554
BASIC REFRACTORY BRICK

Russell Pearce Heuer, Bryn Mawr, Pa., assignor to General Refractories Company, a corporation of Pennsylvania Filed Apr. 21, 1958, Ser. No. 729,799

11 Claims. (Cl. 106—60)

The present invention relates to basic refractory brick made from magnesia which may either be dead burned magnesite or fused magnesia.

A purpose of the invention is to improve the resistance of magnesia basic refractory brick to the action of destructive forces which would normally cause large segments at the hot face of the brick to become detached due to internal cracks generally parallel to the hot face of the brick which form in the brick during use.

A further purpose is to incorporate coarser particles of calcined alumina in a magnesia basic refractory brick to prevent spalling.

A further purpose is to produce a refractory brick comprising a mixture of coarser particles and finer particles of magnesia, unnaturally low in particles of magnesia of intermediate size, and to add relatively coarser particles of calcined alumina to lower the Young's modulus E of the brick after exposure to high temperature, the coarser magnesia particles being of a size such that at least 90 percent by weight rest on a 28 mesh screen and in the preferred embodiment the coarser particles are smaller than 4 mesh, the coarser particles making up 50 to 90 percent by weight and preferably about 75 percent by weight of the magnesia mixture and the finer magnesia particles passing through a 48 mesh screen, preferably a 100 mesh screen, and most desirably a 150 mesh screen, and making up 10 to 50 percent by weight of the magnesia mixture, the coarser alumina particles resting on a 35 mesh screen and preferably on a 28 mesh screen, and comprising between 0.5 and 10 percent and preferably about 5 percent of the entire dry weight of the brick.

A further purpose is to produce a refractory brick by molding the aforesaid magnesia-alumina mixture in moistened form into brick under high pressure, preferably exceeding 10,000 p.s.i. and desirably as much as 20,000 p.s.i., drying and firing the brick in a kiln to temperatures exceeding 1400 degrees C. before use, and preferably exceeding 1550 degrees C.

A further purpose is to prepare the aforesaid moistened magnesia-alumina mixture with a suitable bonding substance such as 1 to 5 percent of kaolin, 1 to 7 percent of iron particles small enough to pass a 28 mesh screen, and preferably small enough to pass a 200 mesh screen, 1 to 3 percent of sulphuric acid, sodium acid sulphate, chromic acid, or magnesium sulphate or 1 to 5 percent as solids of sulphite paper waste or lignin, the bond percentages being based upon the dry weight of the refractory material and being over and above the refractory material, and then to form the brick and dry and cure the same to produce brick suitable for use without kiln firing, and fire the brick at the temperature of kiln firing in the furnace during use.

The drawings illustrate the results of tests useful in explaining the invention.

Figure 1:
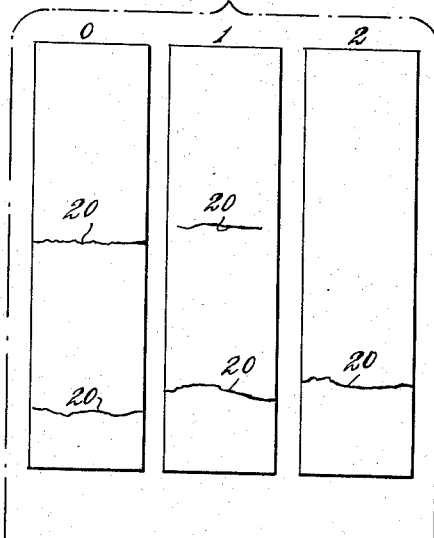
Figure 1 shows side elevations of a series of test brick according to the invention.
Figure 1:
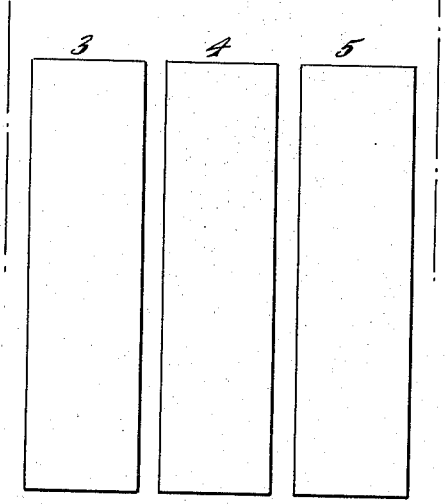

Refractory brick have been conventionally made by molding sized particles of dead burned or fused magnesia, and drying and firing such brick in kilns. Such magnesia refractory brick are very sensitive to temperature changes in high temperature furnaces and are likely to develop transverse cracks across the brick at distances of from 1 to 2 inches or more from the hot face. These cracks cause the brick to spall or lose substantial fragments from the hot face, thereby eventually causing such brick to be entirely destroyed.

In some cases magnesia is mixed with chrome ore forming magnesite-chrome or chrome-magnesite brick. Such brick including both chrome and magnesite are more resistant to spalling. For many purposes, however, the presence of chrome ore as an ingredient in the brick is undesirable.

Magnesia brick free from chrome additions and having improved spalling resistance have been made by mixing coarser magnesia particles (1000 to 3000μ) with finer particles (1 to 100μ) and adding to this mixture 2 to 6 percent by weight of fine alumina particles between 1 and 100μ as set forth in U.S. Patent 2,063,545.

A further improvement in such compositions is described in U.S. Patent 2,744,021. In order to follow this patent it is necessary to restrict the chemical analysis of the magnesia so that the ratio of its CaO content to its $SiO_2$ content by weight is less than 1 and the content $Fe_2O_3$ is between 1 and 4 percent by weight.

For many purposes it is desirable to produce a spall resistant magnesia brick having a very low silica content, for example less than 2 percent by weight, and therefore in many cases having a ratio of lime to silica which exceeds 1. Furthermore, for many purposes it may be desirable to use magnesia whose content of $Fe_2O_3$ is not within the limits of 1 to 4 percent by weight, which is equivalent to a content of elemental iron from 0.7 percent to 2.8 percent by weight of the dry refractory material.

I have found that magnesite having the following approximate analysis

| | Percent |
|---|---|
| $SiO_2$ | 0.6 |
| $Fe_2O_3$ | 7.5 |
| $Al_2O_3$ | 0.5 |
| CaO | 2.8 |
| MgO | 88.6 | is suitable for use in manufacturing spall-resistant magnesia brick using alumina additives, providing the screen size of the magnesia is properly chosen and the alumina is present in the form of calcined coarser particles at least 80 percent by weight of which (and preferably 90 percent by weight of which) rest on a screen of 35 mesh and preferably on a screen of 28 mesh. Practically all of the alumina particles rest on a screen of 14 mesh and pass through a screen of 6 mesh. The quantity of such particles should be between 0.5 and 10 percent by weight of the refractory material of the brick.

Such an improved magnesia brick has its coarser magnesia particles screened to rest at least 90 percent on a 28 mesh screen and all passing through a 4 mesh screen and preferably through a 6 mesh screen. The amount resting on an intermediate size screen such as 8 mesh or 14 mesh is suitably in the range of 20 to 40 percent of the magnesia particles by weight and preferably 30 percent. The finer magnesia particles are screened to pass at least 90 percent by weight through 48 mesh and preferably to pass at least 90 percent by weight through 150 mesh.

In a preferred example, to a mixture of 75 parts by weight of coarse magnesia and 25 parts of fine magnesia, I add coarse particles of so-called "tabular alumina" screened to rest on a 28 mesh screen, and specifically in the preferred embodiment particles passing through an 8 mesh screen and resting on a 14 mesh screen.

Such tabular alumina is made by calcining substantially pure $Al_2O_3$ to reduce its porosity about 5%. Alumina particles for the purpose of the present invention may be fused alumina or particles of natural alumina such as bauxite calcined at a temperature in excess of 1400 degrees C.

Where required, the silica, iron, and other impurities present in the alumina particles are limited to a maximum of 15 percent by weight.

In accordance with the invention, I have made such mixtures, varying the content of the calcined alumina particles from 0 percent to 12 percent of the total refractory in increments of 1%. The brick for the experiments also contained 1 percent of sulphuric acid as a bond. The brick were pressed at 20,000 p.s.i. and burned in a refractory kiln having a maximum temperature of 1600 degrees C.

The resulting brick were tested to determine Young's modulus E by the sonic method and the values obtained are shown below:

| Percent coarser alumina particles added: | $E \times 10^{-6}$ p.s.i. |
|---|---|
| 0 | 20.78 |
| 1 | 18.17 |
| 2 | 10.35 |
| 3 | 4.26 |
| 4 | 2.62 |
| 5 | 1.89 |
| 6 | 1.22 |
| 8 | 0.94 |
| 10 | 0.70 |

It will thus be noted that there is a very rapid reduction in the values of E with relatively small increases in the content of coarser calcined alumina particles.

These results have been compared with a series of bricks in which the alumina content varied from 0 to 10 percent by weight in increments of 1% and the alumina was added as finer calcined alumina particles 90% of which were less than $100\mu$ as taught in U.S. Patent 2,063,543. The results are as follows:

| Percent finer alumina particles added: | $E$ p.s.i. $\times 10^{-6}$ |
|---|---|
| 0 | 20.78 |
| 1 | 21.15 |
| 2 | 20.42 |
| 3 | 19.46 |
| 4 | 16.85 |
| 5 | 8.89 |
| 6 | 4.56 |
| 8 | 3.72 |
| 10 | 3.30 |

It will be noted that the values of Young's modulus E drop off much less markedly in this instance, and are not properly controlled with addition of finer calcined alumina particles. A low value of E is necessary to resist thermal changes without excessive additions of alumina which will disastrously affect. It is therefore evident that the desired results can be obtained with the desired quality of magnesia provided the alumina is present in the form of calcined coarser particles resting on 35 mesh and preferably on 28 mesh.

The above determinatitons of Young's modulus were compared with crack resistance tests simulating furnace conditions.

To make the crack resistance tests, brick sized 9 x 4½ x 3 inches were assembled in a reheat test panel as described in ASTM designation C38-52 for the "Basic Procedure in Panel Spalling Tests for Refractory Brick." The procedure was changed to permit the brick to be laid without mortar and with their longitudinal axes perpendicular to the surface of the panel to be heated.

The panel was then heated in a standard preheating furnace to 1650 degrees C. and held at that temperature for 8 hours.

After the brick cooled, the various samples of brick were removed from the panel and cut by a saw to expose a 9 x 4½ inch section along the longitudinal axis of each brick.

Figure 2:
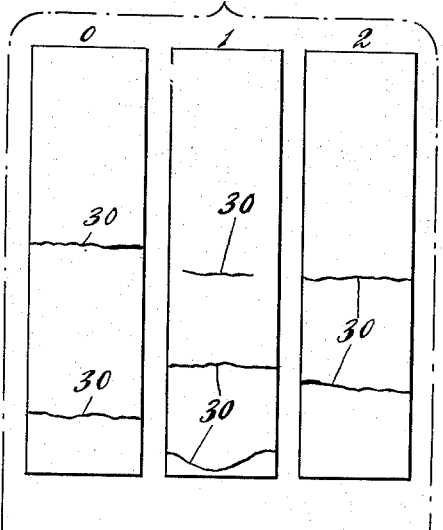
Figure 2 shows for comparison purposes side elevations of prior art brick.
Figure 2:
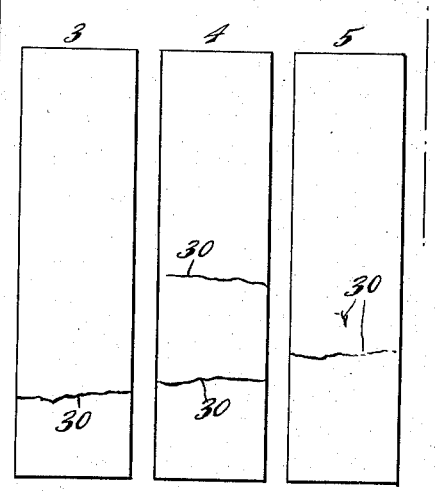

Figures 1 and 2 are sketches made from photographs taken of the test brick to indicate the presence or absence of cracks in the cut sections. Figure 1 shows the brick as above described having contents of coarser alumina particles through 8 mesh and resting on a 14 mesh screen varying from 0 to 5 percent, the bricks being identified by the designations 0, 1, 2, 3, 4 and 5 to show the percentages of coarser alumina.

Figure 2 shows similar bricks similarly designated in which the alumina was added as finer particles of which 90% were smaller than $100\mu$.

In Figure 1 the brick had no alumina and designated zero shows two cracks 20 generally parallel with the hot face, one about 1.5 inches from the hot face and the other about 4.5 inches from the hot face. Both cracks traversed the brick from one side to the other.

The brick containing 1 percent coarser alumina, designated 1, shows two similar cracks 20, but the crack farthest from the hot face is less permanent than in the sample designated 0. The brick with 2 percent of coarser alumina has only one crack 20 located about 2 inches from the hot face. The brick with 3, 4 and 5 percent coarser alumina respectively marked 3, 4 and 5 show no discernible cracking.

Figure 2 where the alumina was added as finer particles has cracks 30 in every one of the brick, even the one containing 5 percent of alumina. Thus the brick with coarser alumina show much less cracking than those with finer alumina.

The principles of the invention are desirably applied to produce brick suitable for use without kiln firing. I preferably take 75 percent of coarser magnesia particles of which more than 90 percent by weight rest on a 28 mesh screen and substantially all pass through a 4 mesh screen, with about 65 percent passing through an 8 mesh screen.

These particles are mixed with 25 percent of finer magnesia particles passing through a 48 mesh screen and a bond is used which functions in an unfired brick. In the preferred example I use 1.1 percent by weight of sulphuric acid on the weight of the dry refractory and about 3.1 percent on the weight of the dry refractory of water.

I can equally well use from 1 to 3 percent of chromic acid, or magnesium sulphate or from 1 to 5 percent of sulphite paper waste solids or lignin, all on the weight of the dry refractory. The bond is over and above the 100% of refractory.

I mix with the magnesia from 5 to 10 percent and preferably about 5 percent of calcined alumina particles, at least 80 percent by weight of which rest on a 35 mesh screen. I preferably also mix 4 percent by weight of sponge iron passing through a 28 mesh screen and preferably through a 35 mesh screen and most desirably through a 200 mesh screen, as an additional bond.

The magnesia used may have a low content of iron oxide, for example 1 percent or 2 percent by weight, similar to the analysis of magnesia made from sea water or magnesium bearing brines. During service such a brick will have an iron oxide content of more than 6 percent by virtue of the sponge iron added as a bond.

The above mix is molded into brick at a pressure of 15,000 p.s.i. or above and cured in carbon dioxide gas at 15 p.s.i. gage pressure, and then dried suitably at a temperature of 200 degrees F. The dried brick are suitable for use without kiln firing. If desired the brick are fired before use at a temperature exceeding 1550 degrees C.

In order to illustrate the properties of unfired brick of this character containing various quantities of coarser calcined alumina, I have subjected such brick to reheat tests for 5 hours at 1650 degrees C. The resulting brick when tested for E show the following:

Percent coarser alumina particles:  E
0 ------------------------------------ 18.32
1 ------------------------------------ 15.42
2 ------------------------------------ 13.06
3 ------------------------------------ 12.65
4 ------------------------------------ 6.02
5 ------------------------------------ 4.01
10 ----------------------------------- 0.98

It will be evident that the desired value of E can be obtained in a bonded brick which is suitable for use without kiln firing after such brick has been reheated to representative furnace temperature.

The unfired brick of the present invention are preferable for many applications. They are cheaper to manufacture than kiln fired brick. They have no shrinkage, and no warpage or size variations caused by kiln firing. Furthermore, when cured in carbon dioxide and dried, they are substantially stronger than any kiln fired magnesia brick with alumina additions. This protects against loss in shipping and handling. Furthermore fired magnesia brick containing alumina are likely to disintegrate when subjected to water vapor, as for example when the brick are laid in refractory mortar and later heated to vaporize and remove the water. The unburned brick, however, are not subject to such disintegration.

The use of iron powder as a bond further provides very desirable strength at intermediate temperatures, but firing at the working face to the high temperature of the furnace, such brick develop the desired low strength and low E values.

The brick of the present invention may if desired have external steel plates in accordance with U.S. Patents Nos. 2,155,165, 2,230,141, 2,247,376, 2,289,911 2,304,170, 2,547,322, 2,791,116 and 2,799,233, and also comolded internal plates in accordance with U.S. Patents Nos. 2,652,793 and 2,791,116. Such unfired brick may also be comolded with hanger means such as stainless steel tabs or metallic hanger elements defining hanger sockets to make them suitable for use in suspended brick construction.

While the invention will desirably be employed to make brick from magnesia high in iron oxide, or to use iron powder to bond unburned brick made from magnesia with either a high or a low iron oxide content, the invention is not limited to brick having a particular content of iron oxide.

The use of the particular particle sizes of magnesia and alumina as disclosed above is independent of the particular chemical composition of the magnesia, providing the magnesia has adequate refractory properties.

All percentages stated herein except porosity are percentages by weight.

Where reference is made to screen sizes it is intended to refer to Tyler standard screens per linear inch.

Where reference is made to commercial screening practice intended to yield particles which will rest on a laboratory screen of designated size, it is understood that commercial tolerances will permit such a product to pass for example 10 percent through the laboratory screen. Similarly commercial products designated to pass through a 4 mesh laboratory screen will show as much as 5 to 10 percent resting on 4 mesh. Such usual tolerances are contemplated herein.

In view of my invention and disclosure variations and modifications to meet individual whim or particular need will doubtless become evident to others skilled in the art to obtain all or part of the benefits of my invention without copying the product shown, and I, therefore, claim all such insofar as they fall within the reasonable spirit and scope of my claims.

Having thus described my invention, what I claim as new and desire to secure by Letters Patent is:

1. A basic refractory brick having increased resistance to cracking, composed of (1) from 0.5 to 10 percent by weight of calcined alumina particles which are large enough to rest at least 80 percent by weight on a screen having 35 mesh per linear inch, and (2) magnesia present as a mixture of coarser particles and finer particles and unnaturally low in intermediate sized particles, at least 90 percent by weight of the magnesia coarser particles being large enough to rest on a screen having 28 mesh per linear inch, and at least 90 percent by weight of the magnesia finer particles being small enough to pass through a screen having at least 48 mesh per linear inch, the coarser particles comprising 50 to 90 percent by weight of the magnesia present and the finer particles comprising 10 to 50 percent by weight of the magnesia particles present, the intermediate size particles of magnesia between 28 and 48 mesh per linear inch composing less than 10 percent by weight of the magnesia particles present.

2. A brick of claim 1, which is unfired and suitable for use without kiln firing.

3. A brick of claim 1, which is kiln fired before use.

4. A brick of claim 1, in which the coarser magnesia particles pass practically entirely through a screen having 4 mesh per linear inch.

5. A brick of claim 1, in which the coarser magnesia particles pass less than 30 percent through a screen having 8 mesh per linear inch.

6. A brick of claim 1, in which the coarser magnesia particles pass 65 percent through a screen having 8 mesh per linear inch.

7. A brick of claim 1 containing in addition 1 to 10 percent by weight of the brick of iron powder substantially all passing through a screen of 28 mesh per linear inch.

8. A brick of claim 1, in which the alumina particles practically all rest on a screen of 14 mesh per linear inch.

9. A brick of claim 1, in which the alumina particles practically all pass through a screen of 6 mesh per linear inch.

10. A brick of claim 1 which contains elemental iron, in which the amount of elemental iron exceeds 2.8 percent by weight.

11. A brick of claim 1, containing silica, and containing the lime typically present in a refractory magnesia, in which the silica content is less than 2 percent by weight, and the ratio of lime to silica exceeds 1.

References Cited in the file of this patent

UNITED STATES PATENTS

| | | |
|---|---|---|
| 2,443,424 | Heuer | June 15, 1948 |
| 2,639,993 | Heuer | May 26, 1953 |
| 2,695,242 | Woodward | Nov. 23, 1954 |